United States Patent [19]

Honda et al.

[11] Patent Number: 4,709,273

[45] Date of Patent: Nov. 24, 1987

[54] ORIGINAL READING DEVICE

[75] Inventors: Haruhisa Honda, Yokohama; Takashi Saito, Ichikawa, both of Japan

[73] Assignee: Canon Kabushiki Kaisha, Tokyo, Japan

[21] Appl. No.: 810,740

[22] Filed: Dec. 19, 1985

[30] Foreign Application Priority Data

Dec. 28, 1984 [JP] Japan .......................... 59-199301[U]

[51] Int. Cl.$^4$ ............................................... H04N 1/04

[52] U.S. Cl. .................................... 358/256; 358/285; 358/293

[58] Field of Search ....................... 358/256, 285, 293; 355/75

[56] References Cited

U.S. PATENT DOCUMENTS

| | | | |
|---|---|---|---|
| 3,588,514 | 6/1971 | Simpkins | 358/293 |
| 3,629,495 | 12/1971 | Cahill | 358/293 |
| 4,189,753 | 2/1980 | Parsons et al. | 358/293 |
| 4,321,628 | 3/1982 | Chan | 358/293 |
| 4,455,577 | 6/1984 | Tokuhara | 358/293 |
| 4,466,736 | 8/1984 | Masaki | 355/75 |
| 4,575,230 | 3/1986 | Carson et al. | 355/75 |
| 4,609,264 | 9/1986 | Podvin et al. | 355/75 |
| 4,609,285 | 9/1986 | Samuels | 355/75 |

*Primary Examiner*—Edward L. Coles, Sr.

*Attorney, Agent, or Firm*—Fitzpatrick, Cella, Harper & Scinto

[57] ABSTRACT

An original reading device includes a main frame, optical image reader, disposed in the frame, for reading an original, an original support having a transparent platen for supporting thereon an original to be read, driving mechanism for causing relative movement between the original support and the reader, a limiting member disposed between the platen and the frame, the limiting member being spaced from the platen by a predetermined amount to contact the platen when the platen deforms beyond a predetermined amount, so as to prevent further deformation of the platen.

38 Claims, 10 Drawing Figures

ORIGINAL READING DEVICE

FIELD OF THE INVENTION AND RELATED ART

The present invention relates to an original reading device for a copying machine, a facsimile machine or an image sensor, more particularly to a construction of an original supporting carriage for supporting an original to be read by the original reading device.

FIG. 1 illustrates an image forming apparatus to which the original reading device of the present invention is applicable. The image forming apparatus 1, more particularly a copying apparatus, has a photosensitive drum 2 having a conductive base drum and a photoconductive layer thereon, the photosensitive drum 2 being mounted for rotation in the direction indicated by an arrow. Around the photosensitive drum 2, there are provided a corona discharger 3, an array 4 of short focus optical elements, a developing device 5, a transfer corona discharger 6 and a cleaning device 7 in the order named in the direction of rotation of the photosensitive drum 2.

In this image forming apparatus 1, the surface of the photosensitive drum 2 is uniformly charged with a predetermined polarity by a corona discharger. Then, an original supported on an original carriage 10 which is reciprocable in the upper position of the image forming apparatus is illuminated by a lamp 11, and the light reflected by the original is introduced to the surface of the photosensitive drum 2 through the array 4 of the short focus optical elements. By this exposure of the drum 2 to the image light, a latent image is formed on the drum 2. The latent image thus formed is developed by the developing device 5, and the developed image is transferred onto a transfer material by a transfer corona discharger 6. The transfer material is manually supplied by an operator to the supply tray 12, and the transfer material is fed to the image transfer station by a pick-up roller 13 and a timing roller 14. The transfer material, after receiving the image, is separated from the photosensitive drum 2 by the separating device 15, and advanced to the image fixing device 17 along the passage 16. The transferred image is fixed on the transfer material by the fixing device 17 into a permanent image. The transfer material is then discharged out to the discharge tray 19 by the discharging roller 18.

FIG. 2 is an enlarged view of the original supporting carriage 10 of the image forming apparatus 1. On a marginal part of the top surface of the casing 20 of the apparatus 1, there is fixed an arcuated rail 21. On the opposite side of the top surface thereof, a supporting member having an L shaped cross-section is fixed on the top of the casing.

An original supporting platen 33 is made of glass having a thickness of 3–4 mm. A platen supporting member 24 of a metal is fixed to an end edge of the platen 33 by a bonding agent or the like. To the supporting member 24, an engaging member 22 is fixed by screws or the like for engagement with the arcuated rail 21. Another supporting member 25 is fixed to another end of the platen glass 33 by a bonding agent or the like. An original pressing plate 26 is mounted to the supporting member 24. The original pressing plate 26 has on its bottom surface a cushion member 27 of sponge or the like. The original pressing plate 26 is pivotable as indicated by an arrow A and is effective to confine an unshown original supported on the original supporting platen 33. The platen 33 is driven by a driving mechanism comprising gears or pulleys not shown. The rails 21 and 22 and the supporting member 23 and a slide 25 are effective to slidably bear the platen 33, so that the platen 33 is driven by the driving mechanism in the direction perpendicular to the sheet of the drawing. Since the illumination light for illuminating the original must pass through the platen, and the light reflected by the original must pass through the platen to be introduced to the surface of the photosensitive member, the platen 33 is required to be transparent to light, and therefore, a transparent glass plate is ordinarily used.

On the other hand, the recent trend is that the size and the weight of the image forming apparatus is reduced even to such an extent that the image forming apparatus is easily carried around. In such a portable image forming apparatus, the weight reduction is particularly desired. In order to achieve this, the thickness of the platen glass may be reduced, or otherwise, a light weight plastic material such as acryl, polycarbonate or the like may be used.

However, when the thickness of the glass is reduced or when the platen is made of a plastic material, the strength of the platen is necessarily decreases with the result that the platen is deformed when a book or the like is pressed to the platen by the operator's hands.

FIG. 3 illustrates the deformation of the platen 33 wherein the force B is applied downwardly to the top surface of the platen 33. Therefore, the original supporting carriage 10 as a whole receives an excessive load, which can result in that the platen 33 is peeled off the supporting member 24 as illustrated in FIG. 3. It is possible that the platen 33 is broken.

From the standpoint of the relation with the imaging optical system, the distance between the surface of the original on the platen 33 and the imaging optical system changes by the deformation of the platen 33. The deformation can be beyond the depth of focus of the imaging optical system, with the result of blurred image formed on the image bearing member. Since the required reduction of the size of the image forming apparatus has promoted use of an array of short focus optical elements such as SELFOC (trade name, available from Nippon Itagarasu Kabushiki Kaisha, Japan), which has short length of focus and therefore has a shallow depth of focus. This has made the above-described problem of the blurred image more significant.

When a transparent plastic material such as acryl in place of the glass as the material of the platen 33, the deformation is larger. For example, when an acrylic resin platen having a thickness of 4 mm and a length of 240 mm is pressed with a force of 10–20 kg, the original supporting carriage deforms by approximately 1 mm in the middle. If the imaging elements are short focus elements for focusing an image of the original onto a photosensitive drum surface spaced by 54 mm, the depth of focus is approximately 0.7 mm. Therefore, the deformation is large enough to prevent sharp image formation.

SUMMARY OF THE INVENTION

Accordingly, it is a principal object of the present invention to provide an original reading device wherein the platen is prevented from deforming beyond a predetermined amount so as to prevent the damage to the platen or the junction which can otherwise result from the deformation.

It is another object of the present invention to provide an original reading device wherein blurred image formation is prevented, which can occur by such a deformation of the platen that the image bearing surface of the original is displaced beyond the depth of focus of the imaging optical system.

According to an embodiment of the present invention, there is provided an original reading device, comprising a main frame, optical reading means, disposed in the frame, for reading an original, an original support having a transparent platen for supporting thereon an original to be read, driving means for moving the original support, a limiting member disposed between the platen and the frame, the limiting member being spaced from the platen by a predetermined amount to contact the platen when the platen deforms beyond a predetermined amount, so as to prevent further deformation of the platen.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
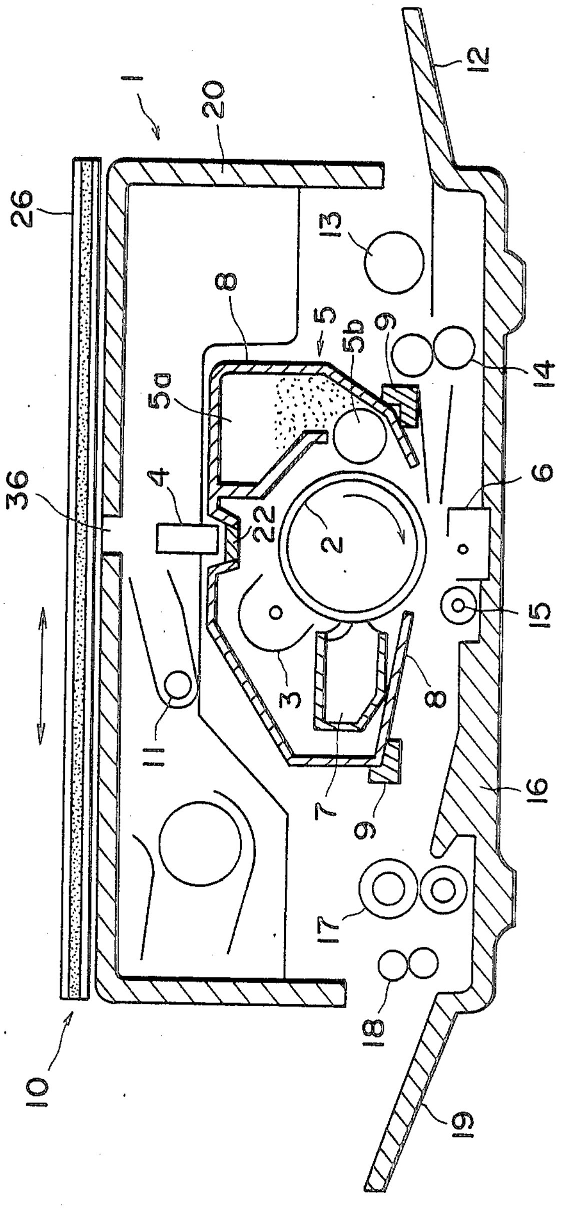
FIG. 1 is a sectional view of an image forming apparatus to which the present invention is applicable.
Figure 2:
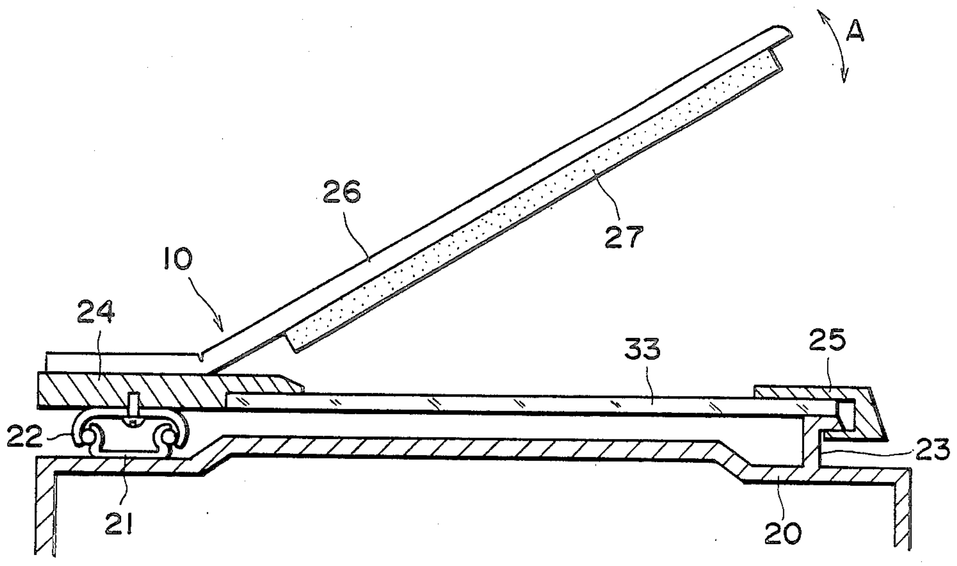
FIG. 2 is a sectional view of an original carriage of a conventional original reading device.
Figure 3:
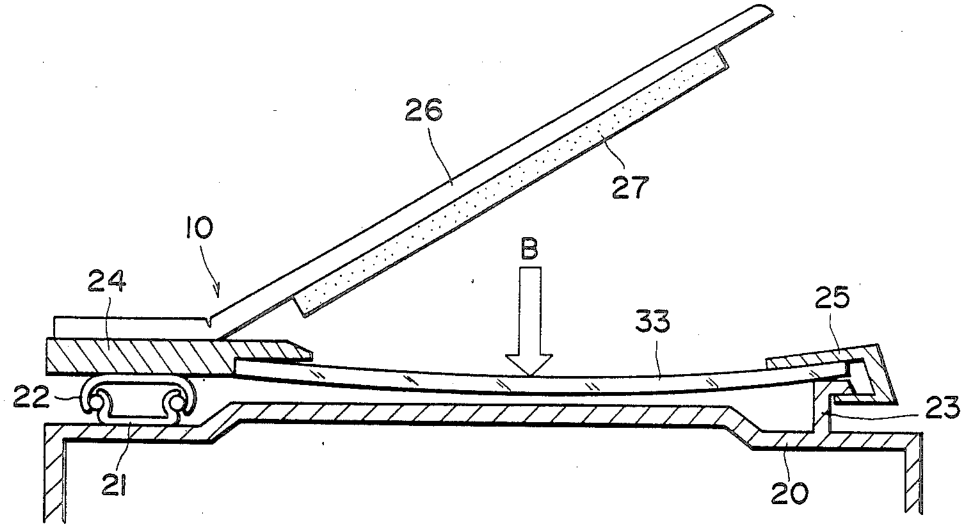
FIG. 3 is a sectional view of the original carriage of FIG. 2 when the platen glass is deformed.

Referring to FIGS. 4–10, the preferred embodiments of the present invention will be described, wherein the members or means having the same structures and functions as in the device described in conjunction with FIGS. 1–3 are assigned the same reference numerals, and therefore, the detailed description thereof is omitted for the sake of simplicity.

FIG. 3 is a lateral sectional view of the original carriage of the original reading device according to a first embodiment of the present invention, wherein there are provided a plurality of ribs 28 extending parallel to movement of the original carriage 10 and fixedly mounted on or formed integrally with the top part of the casing 20 of the image forming apparatus.

Figure 4:
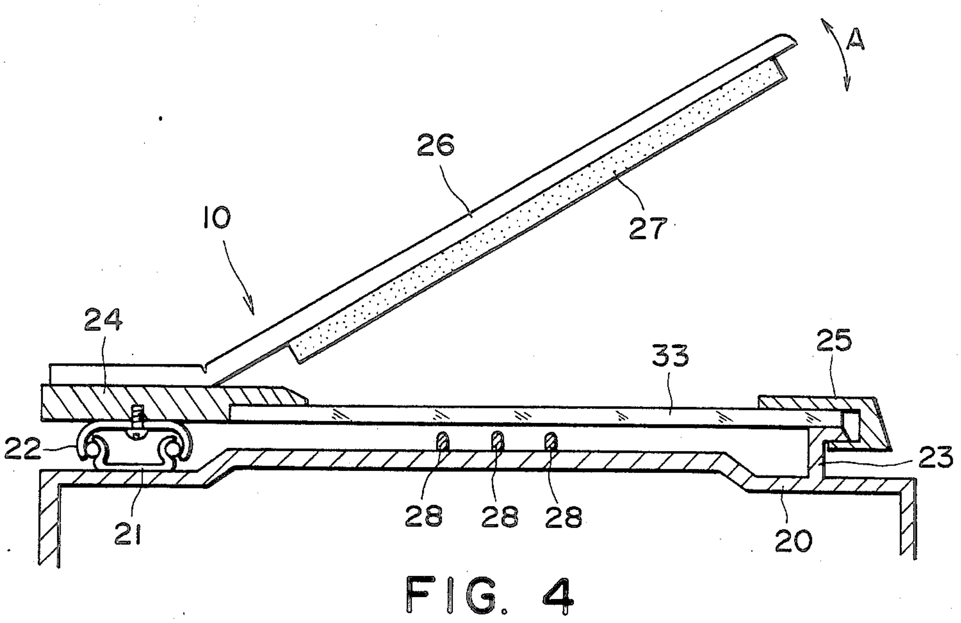
FIG. 4 is a sectional view of an original carriage according to a first embodiment of the present invention.

FIG. 4 is a front sectional view of the original carriage of FIG. 3. As will be understood from those Figures, the ribs 28 are arranged at both sides of an exposure slit 36 which is formed opposed to an array 4 of the short focus optical elements. The surface of the platen 33 contactable to the ribs 28 are formed by a low surface energy material such as Teflon (trade name, available from DuPont, U.S.A.). The end surfaces of the ribs 28 are rounded into a curved and smooth surfaces.

The top surfaces of the ribs 28 are spaced from the bottom surface of the platen 10 by a clearance of 0.3–0.5 mm, for example, when the platen 33 of the original carriage 10 is not deformed. The platen 33 is made of acryl resin or polycarbonate resin in this embodiment.

Since the plurality of the ribs 28 exist between the casing 20 and the platen 33, the platen 33 does not deform beyond a predetermined distance due to the ribs 28 even when a pressing force is exerted on the top surface of the platen 33. Therefore, the platen 33 and the connecting parts thereof to the other parts are prevented from damage or breakage. In addition, the position of the image bearing surface of the original on the platen 33 in the direction substantially perpendicular to the surface is maintained within the depth of focus of the imaging optical element, thus avoiding the occurrence of teh blurred image by unfocused positioning. The surface of the rib 28 contactable to the bottom surface of the platen may be covered by a resin tape.

Figure 6:
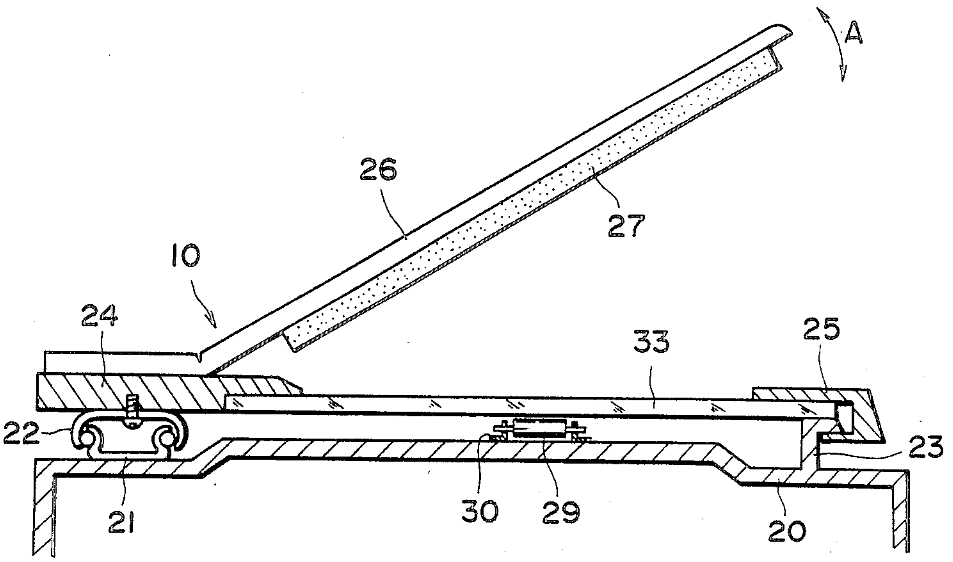
FIG. 6 is a side sectional view of an original carriage according to a second embodiment of the present invention.
Figure 7:
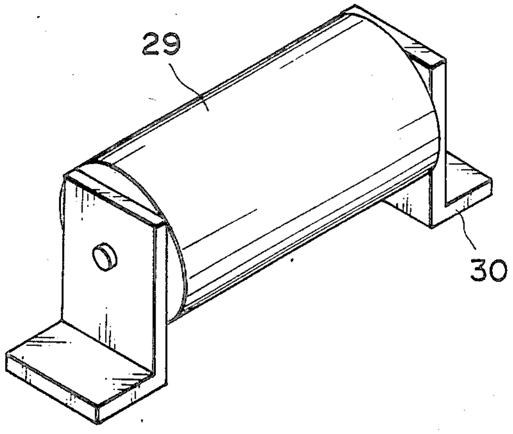
FIG. 7 is a perspective view of a roller used in the second embodiment.

FIGS. 6 and 7 illustrate a second embodiment of the present invention. In this embodiment, rotatable rollers 29 are mounted on the top surface of the casing 20. The rollers 29 are journaled on the respective bearings 30 fixed on the top surface of the casing 20. The original carriage 10 can roll on the rollers 29. When the platen 33 is not deformed, the surfaces of the rollers 29 are spaced from the platen 33 with a small clearance as in the foregoing embodiment. When, on the other hand, the platen 33 is deformed beyond a predetermined level by a pressing force applied thereto, the bottom surface of the platen 33 is contacted to the rollers 29 so that any further deformation is prevented.

In this embodiment employing the rollers 29, the friction with the platen 33 is smaller than in the first embodiment. Accordingly, the load required for driving the original carriage 10 is smaller. Each of the rollers 29 may be of aluminum or aluminum alloy. The surface of such a metal roller may be coated with plastic film. Or, the roller 29 may be of low surface energy material such as Delrin polycarbonate, or elastic material such as chloroprene rubber.

Figure 8:
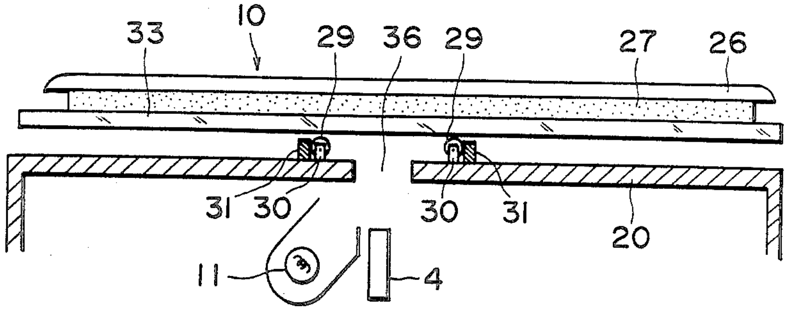
FIG. 8 is a front sectional view of a modified second embodiment wherein a cleaner for the roller is provided.

FIG. 8 illustrates a modification of the second embodiment. In this embodiment, adjacent both sides of the exposure slit 36 opposed to the array 4 of the short focus optical elements, the rollers 29 are rotatably supported, similarly to the second embodiment. A cleaning member 31 is in sliding comtact with the outer surface of each of the rollers 29 in this modified embodiment. When the roller 29 rotates, the surface thereof is cleaned by the sliding contact. The cleaning member 31 may be a brush, cloth, polyester film or the like.

According to this modified embodiment, the rollers 29 are cleaned whenever they rotate, so that the bottom surface of the platen 33 is prevented from contamination by the rollers 29. This is significant because it is rather difficult to access the bottom surface of the platen 33, as compared with the top surface.

Figure 9:
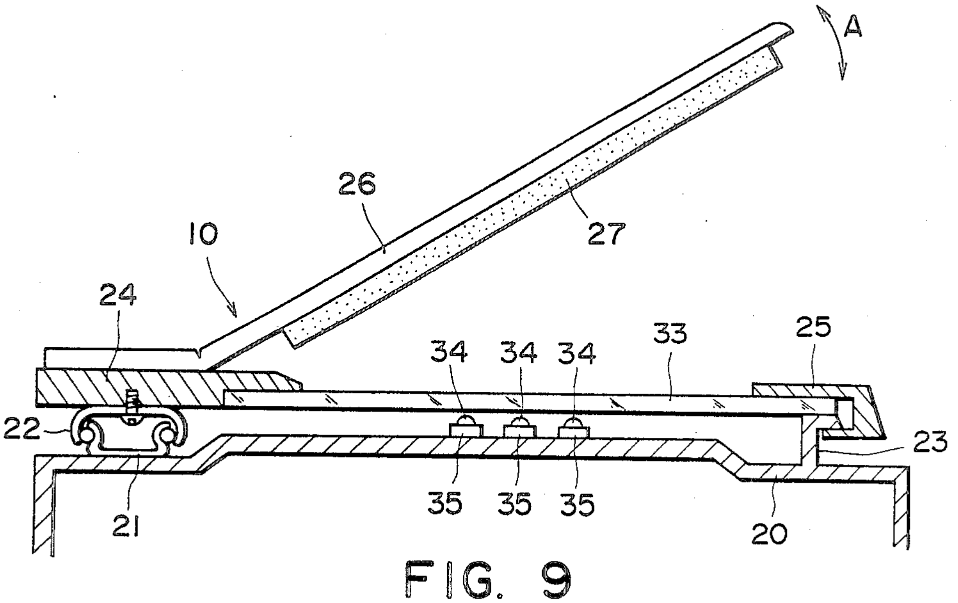
FIG. 9 is a side sectional view of an original carriage according to a third embodiment of the present invention.
Figure 10:
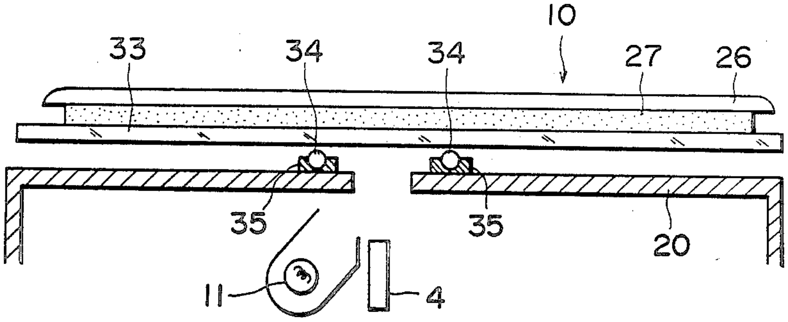
FIG. 10 is a front sectional view of a third embodiment of the present invention.

FIGS. 9 and 10 illustrate a third embodiment of the present invention. In this embodiment rigid balls 34 are employed in place of the rollers 29 in the second embodiment. Those balls 34 are supported by the respective bearings 35 for rotation in any direction. A plurality of such balls 34 are arranged adjacent both ends of the exposure slit 36. When the platen 33 is not deformed, the top surfaces of the balls 34 are spaced from the bottom surface of the platen 33 with a small clearance so that they are maintained uncontacted. However, when the pressing force imposed on the top surface of the platen 33 is so large that the deformation of the platen 33 reaches a predetermined, the bottom surface of the platen 33 is brought into contact with the ball 34, so that the platen 33 does not deform any further. The material of the balls 34 may be the same as of the rollers of the second embodiment. This embodiment is advantageous in that the balls are rotatable in any direction unlike the rollers, so that the balls can meet the displacements of the platen 33 in any directions without difficulty.

While the invention has been described with reference to the structures disclosed herein, it is not confined to the details set forth and this application is intended to cover such modifications or changes as many come within the purposes of the improvements or the scope of the following claims.

What is claimed is:

1. An original reading device, comprising:
a main frame;
optical reading means, disposed in said frame, for reading an original;
an original support having a transparent platen for supporting thereon an original to be read;
driving means for moving said original support;
a limiting member disposed between said platen and said frame, said limiting member being spaced from said platen by a predetermined amount to contact said platen when said platen deforms beyond a predetermined amount, so as to prevent further deformation of said platen.

2. A device according to claim 1, wherein a portion of said limiting member which is contactable to said platen is coated with low surface energy material.

3. A device according to claim 1, wherein a portion of said limiting member which is contactable to said platen is made of elastic material.

4. An original reading device comprising:
a main frame;
optical reading means, disposed in said frame, for reading an original;
an original support having a transparent platen for supporting thereon an original to be read;
driving means for moving said original support;
a limiting member including a roller, said limiting member being disposed between said platen and said frame, said limiting member being spaced from said platen by a predetermined amount to contact said platen when said platen deforms beyond a predetermined amount, so as to prevent further deformation of said platen; and
a cleaning member contacted to an outer surface of said roller.

5. An original reading device, comprising:
a main frame;
optical reading means, disposed in said frame, for reading an original
movable original supporting means having a transparent platen made of a transparent resin for supporting thereon an original to be read;
first and second supporting means, disposed at lateral sides of said original supporting means, for movably supporting said orginal supporting means;
drive means for moving said original supporting means;
a limiting member disposed between said platen and said frame and also between said first and second supporting means, for limiting relative movement between said platen and said frame.

6. A device according ot claim 5, wherein a portion of said limiting member which is contactable to said platen is coated with low surface energy material.

7. A device according to claim 5, wherein a portion of said limiting member which is contactable to said platen is made of elastic material.

8. A device according to claim 5, further comprising an exposure slit in a top surface of said frame between said reading means and said platen, wherein said limiting member is disposed adjacent the exposure slit.

9. A device according to claim 5, wherein said limiting member is spaced from said platen by a predetermined amount to contact said platen when said platen deforms beyond a predetermined amount so as to prevent further deformation of said platen.

10. A device according to claim 9, wherein said optical reading means includes an imaging optical system having an exposure slit, and wherein said space is so determined that when said platen deforms toward said exposure slit, a part of an original supporting surface or said platen opposed to said slit is positioned within a depth of focus of an imaging optical system of said reading means.

11. A device according to claim 10, wherein said imaging optical system includes an array of short focus optical elements, and wherein said depth of focus is that of said array of short focus optical elements.

12. A device according to claim 11, wherein said limiting member includes plural limiting elements arranged along the array of short focus optical elements.

13. An original reading device, comprising:
a main frame;
optical reading means, disposed in said frame for reading an original;
movable original supporting means having a transparent platen for supporting thereon an original to be read;
first and second supporting means, disposed at lateral sides of said original supporting means, for movably supporting said original supporting means;
drive means for moving said original supporting means;
limiting means having a rotatable member, said limiting means being disposed between said platen and said frame and also between said first and second supporting means, for limiting relative movement between said platen and said frame.

14. A device according to claim 13, wherein said rotatable member is spaced from said platen by a predetermined amount to contact said platen when said platen deforms beyond a predetermined amount so as to prevent further deformation of said platen.

15. A device according to claim 13, wherein said limiting member includes a plurality of rotatable members.

16. A device according to claim 13, wherein said rotatable member is coated with low surface energy material.

17. A device according to claim 13, wherein said rotatable member is elastic.

18. A device according to claim 13, further comprising an exposure slit in a top surface of said frame between said reading means and said platen, wherein said rotatable member is disposed adjacent the slit.

19. A device according to claim 13, wherein said rotatable member is rotatable in any direction.

20. A device according to claim 13, further comprising a cleaning member contacted to an outer surface of said rotatable member.

21. A device according to claim 3, wherein said platen is made of a transparent resin.

22. An original reading device, comprising:
a main frame;
optical reading means, disposed in said frame, for reading an original;
movable original supporting means having a transparent platen for supporting thereon an original to be read;
first and second supporting means, disposed at lateral sides of said original supporting means, for movably supporting said original supporting means;
drive means for moving said original supporting means;
an exposure sit in a top surface of said frame between said reading means and said platen;
a limiting member disposed between said platen and said frame and also between said first and second supporting means, for limiting relative movement between said platen and said frame, said limiting member being contactable to said platen at a position offset from said exposure slit in movement direction of said original supporting means.

23. A device according to claim 22, wherein a portion of said limiting member which is contactable to said platen is coated with low surface energy material.

24. A device according to claim 22, wherein a portion of said limiting member which is contactable to said platen is made of elastic material.

25. A device according to claim 22, wherein said limiting member is spaced from said platen by a predetermined amount to contact said platen when said platen deforms beyond predetermined amount so as to prevent further deformation of said platen.

26. A device according to claim 25, wherein said space is so determined that when said platen deforms toward said exposure slit, a part of an original supporting surface of said platen opposed to said slit is positioned within a depth of focus of an imaging optical system of said reading means.

27. A device according to claim 26, wherein said imaging optical system includes an array of short focus optical elements, and wherein said depth of focus is that of said array of short focus optical elements.

28. A device according to claim 22, wherein said platen is made of a transparent resin.

29. A device according to claim 22, wherein said limiting member extends within a length of said slit.

30. An original reading device, comprising:
a main frame;
optical reading means, disposed in said frame; for reading an original;
movable original supporting means having a transparent platen for supporting thereon an original to be read;
first and second supporting means, disposed at lateral sides of said original supporting means, for movably supporting said original supporting means;
drive means for moving said original supporting means;
limiting members disposed between said platen and said frame and also between said first and second supporting means, for limiting relative movement between said platen and said frame, said limiting members being disposed at different positions with respect to movement direction of said original supporting means.

31. A device according to claim 30, further comprising an exposure slit in a top surface of said frame between said reading means and said platen, wherein said limiting members are disposed at respective sides of the slit.

32. A device according to claim 31, wherein said limiting member extends within a length of said slit.

33. A device according to claim 30, wherein a portion of said limiting member which is contactable to said platen is coated with low surface energy material.

34. A device according to claim 30, wherein a portion of said limiting member which is contactable to said platen is made of elastic material.

35. A device according to claim 30, wherein said limiting member is spaced from said platen by a predetermined amount to contact said platen when said platen deforms beyond a predetermined amount so as to prevent further deformation of said platen.

36. A device according to claim 35, wherein said optical reading means includes an imaging optical system having an exposure slit, and wherein said space is so determined that when said platen deforms toward said exposure slit, a part of an original suporting surface of said platen opposed to said slit is positioned within a depth of focus of an imaging optical system of said reading means.

37. A device according to claim 36, wherein said imaging optical system includes an array of short focus optical elements, and wherein said depth of focus is that of said array of short focus optical elements.

38. A device according to claim 30, wherein said platen is made of a transparent resin.

* * * * *

UNITED STATES PATENT AND TRADEMARK OFFICE

CERTIFICATE OF CORRECTION

PATENT NO. : 4,709,273

DATED : November 24, 1987

INVENTOR(S) : HARUHISA HONDA, ET AL.

It is certified that error appears in the above-identified patent and that said Letters Patent is hereby corrected as shown below:

AT [56] IN REFERENCES CITED

U.S. Patent Documents, "Chan" should be --Crean--.

COLUMN 1

Line 53, "L shaped" should read --L-shaped--.

COLUMN 2

Line 24, "is" should be deleted.
Line 49, "acryl in" should read --acryl is used in--.

COLUMN 3

Figure 5:
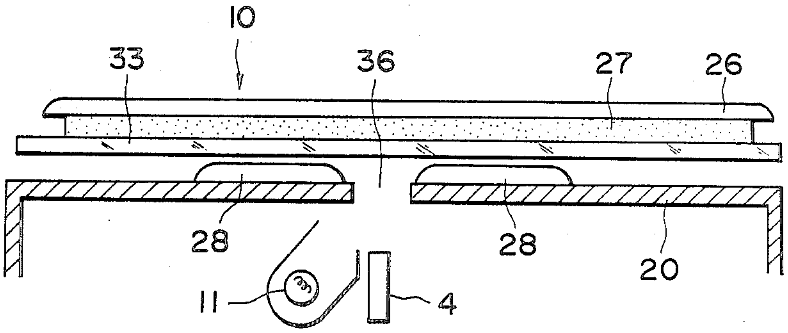
FIG. 5 is a front sectional view of the original carriage of FIG. 4.

Line 60, "FIG. 3" should read --FIG. 4--.
Lines 67-68, "FIG. 4 is a front sectional view of the original carriage of FIG. 3." should read --FIG. 5 is a front sectional view of the original carriage of FIG. 4.--.

COLUMN 4

Line 9, "platen 10" should read --platen 33--.
Line 24, "teh" should read --the--.
Line 54, "comtact" should read --contact--.

UNITED STATES PATENT AND TRADEMARK OFFICE

CERTIFICATE OF CORRECTION

PATENT NO. : 4,709,273

DATED : November 24, 1987

INVENTOR(S) : HARUHISA HONDA, ET AL.

It is certified that error appears in the above-identified patent and that said Letters Patent is hereby corrected as shown below:

COLUMN 5

Line 9, "predetermined," should read --predetermined amount,--.
Line 21, "many" should read --may--.
Line 65, "original" should read --original;--.

COLUMN 6

Line 10, "ot" should read --to--.
Line 29, "or" should read --of--.

COLUMN 7

Line 12, "claim 3," should read --claim 13,--.
Line 26, "sit" should read --slit--.

UNITED STATES PATENT AND TRADEMARK OFFICE
CERTIFICATE OF CORRECTION

PATENT NO. : 4,709,273

DATED : November 24, 1987

INVENTOR(S) : HARUHISA HONDA, ET AL.

It is certified that error appears in the above-identified patent and that said Letters Patent is hereby corrected as shown below:

COLUMN 8

Line 46, "suporting" should read --supporting--.

Signed and Sealed this

Seventeenth Day of January, 1989

*Attest:*

DONALD J. QUIGG

*Attesting Officer*

*Commissioner of Patents and Trademarks*